Patented Oct. 18, 1938

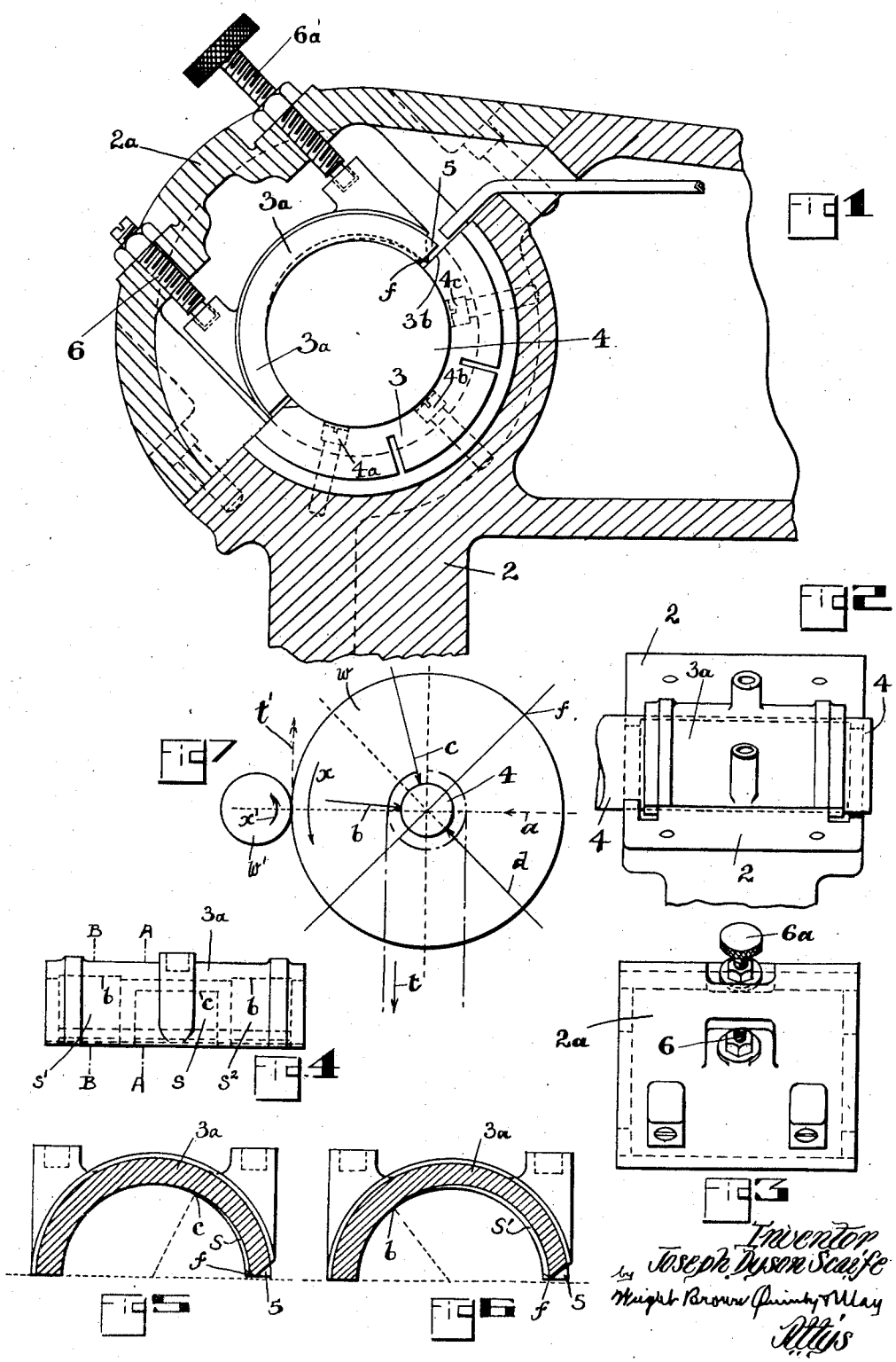

2,133,476

UNITED STATES PATENT OFFICE 2,133,476

MEANS FOR SUPPLYING LUBRICANT TO THE BEARINGS OF ROTARY SHAFTS AND THE LIKE

Joseph Dyson Scaife, Cross Hills, near Keighley, England, assignor of one-half to John Lund Limited, Eastburn, near Keighley, England Application October 2, 1935, Serial No. 43,240
In Great Britain October 13, 1934

5 Claims. (Cl. 308—121)

This invention relates to a means for supporting and lubricating the bearings of rotary shafts or revolving bodies which by the character of work that such rotary members have to perform or withstand are subjected to forces which tend to raise said shafts from the support of their fixed bearings, as, for example, the rotary shaft carrying a cylindrical cutting or grinding member tends to be raised by the reactions of the forces of the cutting or grinding surfaces upon the work or member being treated.

The provision of means for resisting the said reacting force, and effectively preventing the shaft from rising from or leaving its fixed supports while yet securing essential lubrication of the wear-resisting surfaces, is the object of my present invention.

This object I secure by the formation of fixed supports and bearing surfaces with appropriately formed bush lining members for contact with the rotating surface of the shaft. Ducts or passages are provided in the inner surface of the upper half or superposed portion of the bush or lining member of the bearings which takes over the upper part of the peripheral surface of the rotary shaft, these ducts leading from a cavity containing the supply of lubricant. The revolving motion of the shaft carries the lubricant or causes it to flow under pressure to the surface to be lubricated.

I hereinafter describe my invention by reference to bearings for supporting a rotary shaft, from which it will be obvious to those having a knowledge of means for lubricating the surfaces of other rotary bodies than shafts that I might use same to effect lubrication of such other bodies.

In the accompanying sheet of drawings which is illustrative of my invention:—

Fig. 1 is a sectional end elevation of a rotary shaft with its bearings or supports and outer cap or covering forming part of the bearings, while the two bush members are shown in elevation.

Fig. 2 is a view of the bearing parts shown by Fig. 1 as seen in the direction looking from left to right of said figure, but with the cap which secures the bushes in position removed therefrom so that the bearing and the bushes may be seen.

Fig. 3 is a view of the cap or covering of the bearing removed from the parts shown in Fig. 2 as seen in the same direction as said Fig. 2.

Fig. 4 is an elevation of the loose or upper portion of the bush shown in end elevation by Fig. 1.

Fig. 5 is a sectional end elevation taken on line A—A of Fig. 4 and as seen looking from right to left of said figure.

Fig. 6 is a view similar to Fig. 5 but is taken on line B—B shown by Fig. 4 and as seen in the said direction from right to left of said Figure 4.

Fig. 7 is a diagram illustrating by the arrows $x$ and $x^1$ the direction of motion of the rotary cutter $w$ and of the work or member $w^1$ upon which it acts, while the other arrows $a\ b\ c$ indicate the directions of forces acting upon the shaft 4 which supports the cutter $w$, during the operations of the apparatus.

The bearings 2 and the bush or lining members 3 and $3a$ for the shaft 4 are so formed and arranged that a storage cavity or receptacle 5 for containing the lubricant is made to extend the full width, or approximately so, of the edge of the bush $3a$ adjacent part of same which rests upon the edge $3b$ of the bush bearing 3, an edge of the bushing $3a$ being beveled for most of its length to form such receptacle.

The said cavity 5 is so formed or arranged that an outlet at $f$ from same will conduct the lubricant to the surface of the desired part of the shaft 4 and particularly to such positions thereon which are higher than the axis of said shaft, so that by gravity and by the rotary motions of the shaft the cavity 5 is always enabled to contain a sufficient supply of lubricant to replace such lubricant as is drained off by the periphery of said shaft 4 rotating in contact with the inflowing lubricant through the opening $f$.

The internal surface of the cap $3a$ has eccentric portions forming three tapering hollows or recesses or hollow portions $s$, $s^1$ and $s^2$ which extend part way around the shaft. Each of said recesses or hollow portions is made to commence at the edge of the opening $f$ into which the supply duct or cavity 5 opens, in order that the lubricant flowing from same may enter the hollows at their large end.

The recessed or hollow portion $s$ occupies a central part of the bush member $3a$, while the recesses $s^1$ and $s^2$ (see Fig. 4) are formed in the same member and adjacent or in close proximity to the central recess $s$.

The central cavity $s$ is made to taper or become of less depth in the bush $3a$ as it extends through an arc of about 60° from the opening $f$ until it reaches a line at $c$. The two adjacent recesses $s^1$ and $s^2$ are also of tapered formation again commencing with their greatest depth at $f$ and extending through an arc of about 130° to a line $b$.

It is desirable that in the cavities $s$, $s^1$ and $s^2$ the rate of taper be equal. Since the arcuate length of each of the cavities $s^1$ and $s^2$ is approximately twice the length of the cavity s, the maximum depth of the former at the inlet f is approximately twice that of the latter.

By the said recesses being formed as stated the lubricant which flows through the recess s lubricates the central part of the shaft 4, while the streams of lubricant flowing through the recesses s¹ and s² lubricate the other adjacent surfaces of the said shaft 4. And by the rotary actions of the shaft's periphery upon the flowing and gradually decreasing thicknesses of the flowing lubricant, applying pressure to said flowing lubricant, I find all parts of the surface of the shaft which require lubrication have the lubricant forced against them in a manner that may be said almost to cause the revolving shaft to float in lubricant. This conclusion is supported by the fact that by having the lower bush 3 firmly pressed down upon the bearings 2 by screws 4a and 4b and 4c, and by slightly relieving the bush 3a from pressing down upon the shaft 4 by unscrewing for a short space the screws 6 and 6a taking through the cap or cover 2a, I have found that the lubricant flows from the duct 5 over the periphery of the shaft 4 and forward under said periphery back to said duct 5.

In cases where the nature of the work being effected requires greater or less power and resistance, the lengths of the curved recesses s, s¹ and s² may be increased or reduced as said conditions necessitate.

By the rotary shaft 4 or other body conveying the lubricant under pressure through the arrangement of the recesses hereinbefore described, said pressure acts upon the rotary shaft or body in a desired direction to keep its rotary surface upon those of its fixed supporting bearings. The arrows a, t and t¹ in Fig. 7 indicate the direction of the forces of the rotary cutter w and the work w¹, while the arrows b, c and d indicate the directions in which the bearing surfaces act to resist the said forces.

In order to keep a supply of lubricant within the supply duct as constant as is necessary, I make use of any appropriate circulating pump mechanism which may raise the lubricant from a lower to a higher position to feed the supply duct 5 through a pipe 5a as may be required.

Such being the nature and object of my said invention, what I claim is:—

1. In a lubricating bearing, a semi-cylindrical bushing having an edge beveled to form a reservoir for lubricant, the inner surface of said bushing having a plurality of hollows extending arcuately side-by-side from the beveled edge different distances toward the other edge and separated from each other by narrow areas of surface concentric with the axis of the bearing, each said hollow tapering gradually in depth.

2. In a lubricating bearing, a semi-cylindrical bushing having an edge beveled to form a reservoir for lubricant, the inner surface of said bushing having a plurality of hollows extending arcuately side-by-side from the beveled edge different distances toward the other edge and separated from each other by narrow areas of surface concentric with the axis of the bearing, each said hollow tapering in depth, the maximum depths of said hollows at said beveled edge being approximately proportional to their arcuate lengths.

3. In a lubricating bearing, a semi-cylindrical bushing having an edge beveled to form a reservoir for lubricant, the inner surface of said bushing having a central hollow extending arcuately from said beveled edge for about sixty degrees and tapering in depth, and a hollow on either side of said central hollow extending arcuately about one hundred and thirty degrees from said beveled edge and tapering in depth.

4. In a lubricating bearing, a semi-cylindrical bushing having an edge beveled to form a reservoir for lubricant, the inner surface of said bushing having a central hollow extending arcuately from said beveled edge for about sixty degrees and tapering in depth, and a hollow on either side of said central hollow extending arcuately about one hundred and thirty degrees from said beveled edge and tapering in depth, the rate of taper of the depth of all said hollows being substantially uniform.

5. A lubricating bearing for a horizontal shaft for a grinding wheel or the like, comprising a pair of semi-cylindrical bushings fitted to said shaft, said bushings being disposed so that their abutting edges are in an inclined plane, the upper bushing having a plurality of separate hollows extending for a substantial portion of its length from the upper abutting edge toward the lower abutting edge and gradually tapering in depth, one of said hollows extending arcuately to a point slightly beyond the top of the shaft, another said hollow extending arcuately to a point well beyond the top of the shaft.

JOSEPH DYSON SCAIFE.